Figure 1:
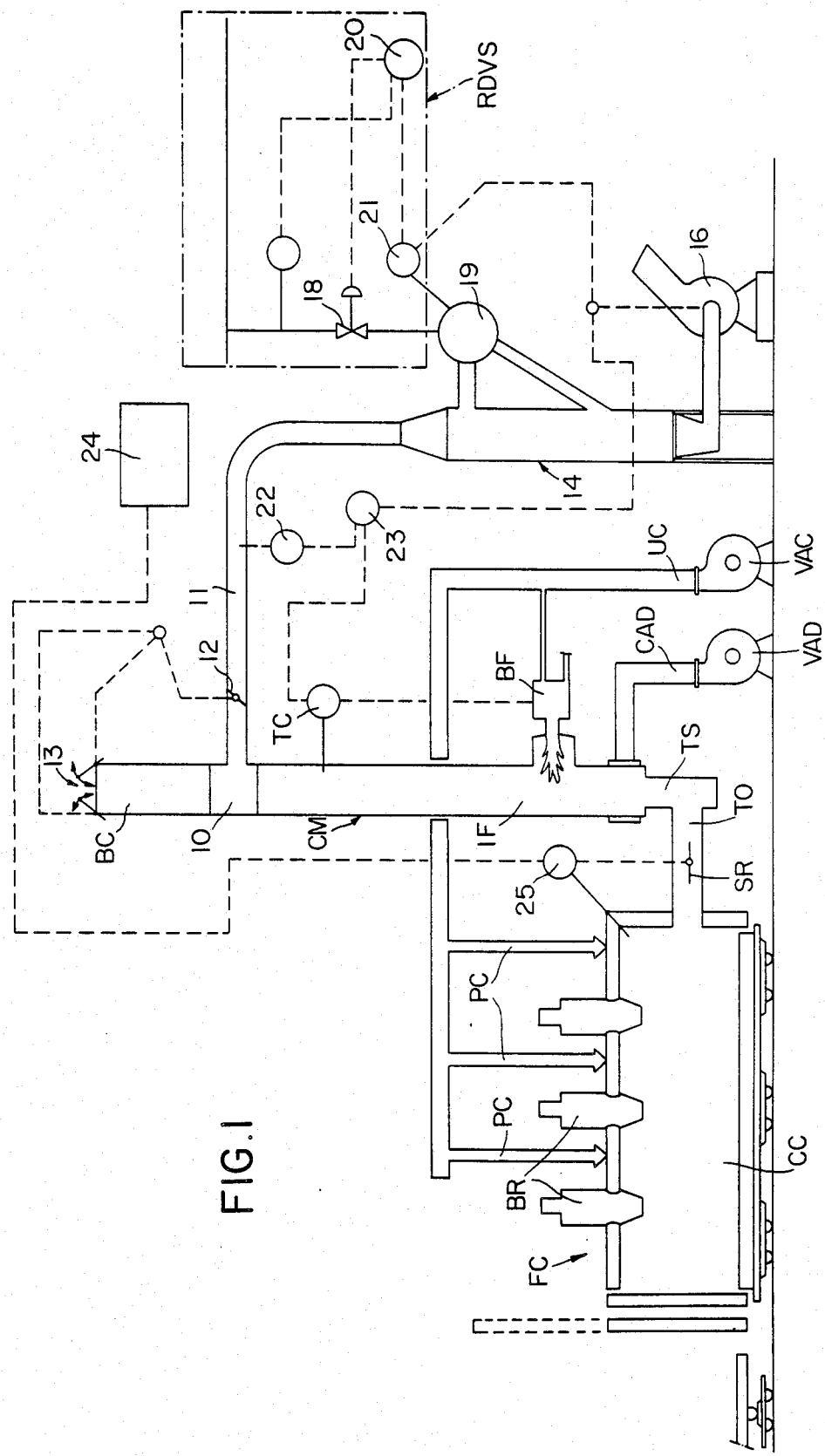

United States Patent [19]
Genevois et al.

[11] Patent Number: 4,636,169
[45] Date of Patent: Jan. 13, 1987

[54] UNIT FOR REGENERATING THE HEAT PRODUCED BY EXHAUST GASES IN MOVABLE HEARTH FURNACES USED FOR BAKING OR REBAKING CARBONACEOUS MATERIALS

[76] Inventors: Jean L. Genevois, Corso Sempione, 3, 20145 Milano; Antonio Lucia, Via Pacinotti, 20/B, 05100 Terni; Emidio Di Fabio, Via dei Tigli, 6/4, 20020 Arese Mi, all of Italy

[21] Appl. No.: 751,795

[22] Filed: Jul. 3, 1985

[30] Foreign Application Priority Data
Jul. 4, 1984 [IT] Italy .............................. 48495 A/84

[51] Int. Cl.⁴ .......................... F27B 19/00; F27B 7/00
[52] U.S. Cl. ...................................... 432/90; 432/72; 432/192
[58] Field of Search ...................... 432/90, 91, 192, 72

[56] References Cited
U.S. PATENT DOCUMENTS
1,807,069  5/1931  McDaniel ............................. 432/90
4,284,404  8/1981  Genevois et al. .................. 432/192
4,503,018  3/1985  Gardner et al. ..................... 432/72

*Primary Examiner*—John J. Camby
*Attorney, Agent, or Firm*—Brooks Haidt Haffner & Delahunty

[57] ABSTRACT

A unit for regenerating the heat produced by exhaust gases in movable hearth baking furnaces not altering the operating conditions of the furnace and not causing any damage thereto, either obtaining steam or heating at high temperature diathermic oil to be used for heating the mixtures intended to be used for preparing carbonaceous articles, which unit comprises: a side inlet mounted on the smokestack and provided with an on-off valve and a sector valve placed at the outlet of the smokestack; an exhauster; a control logic; a pressure adjuster; and, a temperature adjuster associated to a heat regenerator of a known type.

5 Claims, 2 Drawing Figures

UNIT FOR REGENERATING THE HEAT PRODUCED BY EXHAUST GASES IN MOVABLE HEARTH FURNACES USED FOR BAKING OR REBAKING CARBONACEOUS MATERIALS

This invention refers to heat regeneration in plants using a big quantity of heat and, more particularly, to heat regeneration from exhaust gases of moveable hearth furnaces used for baking or rebaking carbon-based articles after impregnation thereof with pitch, tar or resin.

More particularly, this invention refers to a unit comprising: a side port mounted on the smokestack and provided with an on-off valve; a valve comprising a plurality of sectors placed at the outlet of the smokestack; an exhauster; a control logic; a pressure adjuster; and, a temperature controller connected to a heat regenerator of a known type.

The unit of the invention is intended to convey the smoke from the smokestack of movable hearth furnaces to a heat regenerator of a known type consisting of a tube nest or a coil or an exchanger of a different type for either producing saturated steam or heating diathermic oil.

The unit of the invention is automatically controlled, thus previnting the furnace operative conditions from being altered and allowing the regenerator fluid to be used in an existing pipeline.

As known in the art, movable hearth furnaces are provided with a device called smoke incinerator placed between the furnace and the smokestack. This smoke incinerator is intended to burn the compounds produced by the distillation of pitch, tar or resin which are either the binders or the filters of the articles to be baked or rebaked and are present in big quantities in the smoke.

At present, the burning of these compounds is needed for preventing any pollution resulting from the exhaustion thereof into the atmosphere. This burning requires the use of an auxiliary burner and the input of big quantities of air to both obtain the combustion of the compound and to prevent the gas temperature from rising excessively.

The system comprising the furnace, the incinerator and the smokestack is automatically controlled thus ensuring a continuous overpressure of some millimeters of water column in the furnace to prevent any air input which could form an explosive mixture together with the distillation products, thus causing a bursting.

Furthermore, to avoid this bursting the oxygen in the furnace atmosphere is maintained at a low level by adjusting the furnace burners to operate with a little air excess.

It will be evident that this system is in a dynamic balance and to the time being the problem of heat regeneration from smoke after burning in suitable devices had no practical solutions.

Accordingly, it is an object of the invention to provide a unit intended to regenerate the heat from exhaust gases of movable hearth baking furnaces, which unit can be easily mounted in the furnaces and has such a construction and operation that the operating conditions of the furnaces are not affected.

Furthermore, the quantity of the heat regenerated during an operating cycle is not only variable but, in case of a single furnace, is also subject to stops due to charging and discharging of the furnace and to the first step of the operating cycle when the distilled substances are not produced.

Accordingly, the unit of the invention has such a construction as to operate by supplying either the saturated steam produced or the heated diathermic oil to a pipeline supplied by a specific device for producing the steam or heating the diathermic oil which should possibly be already existing.

Figure 2:
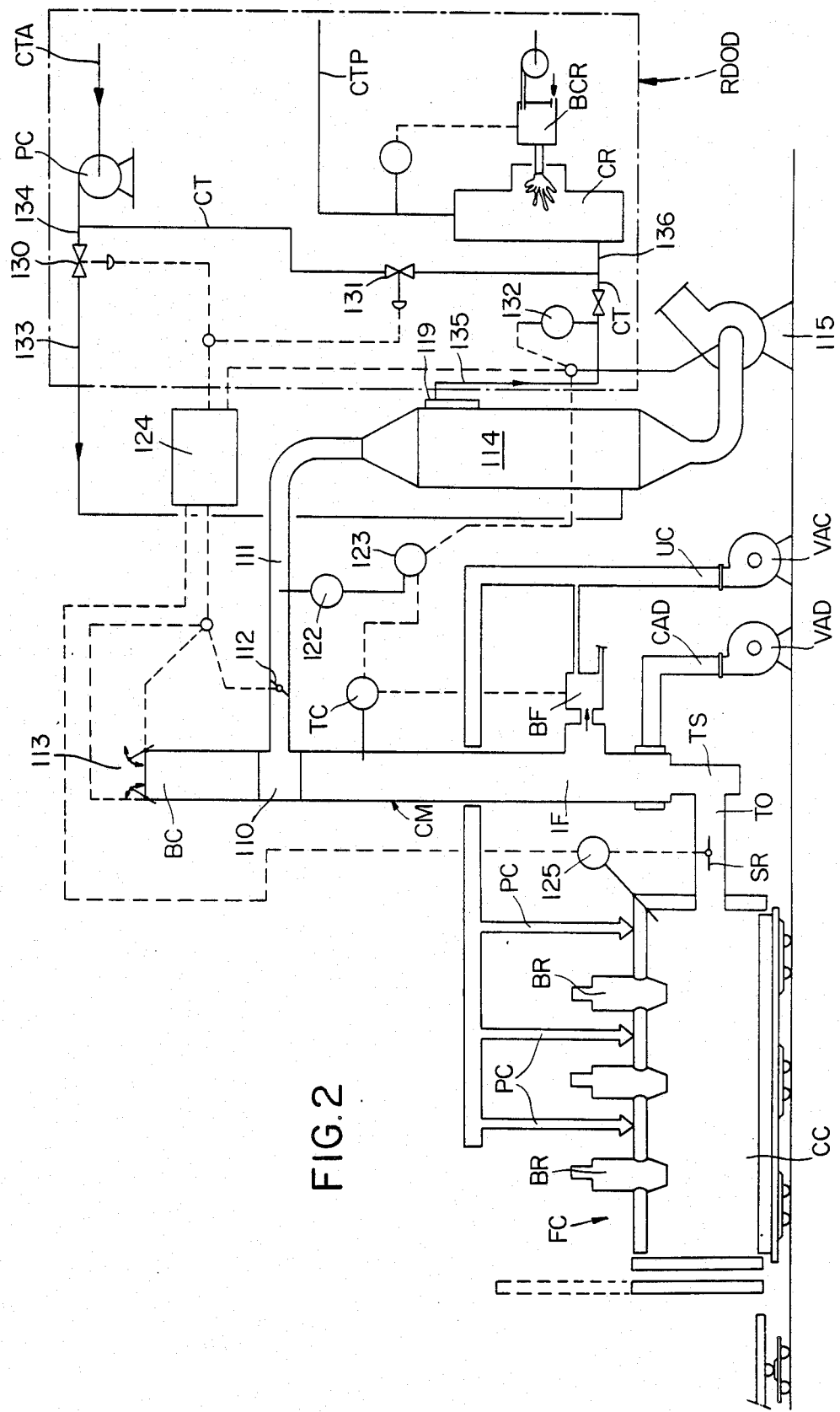

The unit of the invention will be now described with reference to the annexed drawings, wherein:

FIG. 1 shows a heat regenerating unit for the production of saturated steam; and, FIG. 2 shows a heat regenerating unit making use of thermic oil heating.

FIG. 1 schematically shows the unit of the invention and the movable hearth furnace with which this unit is intended to cooperate.

A movable hearth furnace FC normally comprises: a baking chamber CC having burners BR and a plurality of combustion air inlets PC supplied by a fan VAC placed outside furnace FC through a single pipe; a smoke pipe consisting of a first horizontal portion TO having a gate SR fitted thereon and a second portion TS comprising a smoke incinerator IF provided with a burner BF; a smokestack CM, placed downstream of smoke incinerator IF comprising a thermocouple TC operatively connected to burner BF to control the operation thereof according to the temperature of the smoke passing through smokestack CM; and, a dilution air pipe CAD which supplies the dilution air supplied by fan VAD to the smoke incinerator.

As mentioned above, on the baking or rebaking of carbonaceous articles in chamber CC from pitch tar or resin, which form the binders or the filters of these articles, volatile compounds are produced by distillation which are sucked by the furnace smokestack together with the smoke. Since the discharge of these extremely polluting compounds into the atmosphere is not allowed, these compounds are incinerated in a suitable burner incinerator.

The incineration or combustion of these compounds and the heat generated by the burner cause the smoke temperature to increase, which is clearly shown by the "fire crown" visible on the smokestacks of these furnaces. The "fire crown" clearly shows that a big quantity of heat is dissipated in the atmosphere.

Accordingly, the applicant has devised a unit intended to regenerate this heat and use the same either producing steam to be supplied to a steam pipeline RDVS, which should possibly be already existing, intended to provide several services and carry out various functions in the plants comprising movable hearth furnaces, or heating diathermic oil to be supplied to a suitable diathermic oil delivery pipeline RDOD. Either one or the other heating means is used in carbon-based article manufacturing plants to heat the mixers used for preparing the mixtures necessary to the production of carbonaceous articles.

FIG. 1 also shows that the unit of the invention comprises in combination: a pipe connection consisting of a sleeve 10 fitted in smokestack CM and a side pipe 11 having an on-off valve 12 placed therein; a valve 13 comprising two or more sectors placed at the mouth or top BC of smokestack CM, each sector being automatically controlled either by an electric motor or by a different means, a heat regenerator 14 of a known type connected to pipe 11; an exhauster 16 operated by a variable speed motor; a valve 18 placed in the connection of steam generator 19 using the heat regenerated by regenerator 14 with a steam delivery pipeline VDVS; a first steam pressure adjuster 20 controlling connecting valve 18; a second pressure adjuster 21 controlling the steam pressure in steam generator 19; a temperature detecting thermo-couple TC placed in smokestack CM at the outlet of burner IF; a second temperature measuring thermo-couple 22 placed at the inlet of heat regenerator 14; a temperature adjuster 23; and, a control logic 24.

The unit of FIG. 1 operates as follows: on the starting of the distillation step in baking or rebaking furnace FC burner BF of incinerator IF turns on operating dilution air fan VAD. Burner BF and fan VAD are controlled by thermocouple TC in smokestack CM through a known system.

On-off valve 12 is opened and exhauster 16 is operated at a predetermined minimum constant speed, while control logic 24 closes sector valve 13.

The operation of the unit will be now automatically controlled by control logic 24 according to the data supplied thereto by pressure adjuster 21, which controls the pressure of the steam produced by steam generator 19, and temperature adjuster 23. Temperature adjuster 23 determines the difference between the temperature at the outlet of incinerator IF measured by thermocouple TC and the gas temperature at the input of regenerator 14 measured by thermocouple 22.

In these conditions exhauster 16 will be operated by the variable speed motor connected thereto at such a speed as to suck all the hot smoke present in smokestack CM and a minimum quantity of "dummy" air which is sucked through mouth BC of smokestack CM. In connection therewith it should be noted that valve 13 has such a construction as to never seal mouth BC.

Thus, heat regenerator 14 will slowly pass from the initial conditions to the conditions in which the pressure of the steam produced is either equal to or higher than the pressure (12 atm.) in steam delivery pipeline VDVS.

When the pressure of the steam produced by regenerator 14 exceeds the pressure of steam pipeline VDVS adjuster 20 is operated which will control the opening of valve 18 in order to supply the steam to the main pipeline.

When the quantity of the steam required by the main pipeline is lower than the steam produced by regenerator 14 and the pressure in generator 19 tends to exceed the predetermined value, adjuster 23 slows down the speed of exhauster 16 which will thus suck a lower quantity of gas.

In these conditions, the pressure within furnace FC, indicated by manometer 25, tends to increase and, accordingly, control logic 24 opens one or more sectors of valve 13, thus allowing a portion of the gases to escape from the smokestack.

FIG. 2 shows a movable hearth furnace FC for baking or rebaking carbonaceous materials equal to the furnace shown in FIG. 1. This furnace, however, is provided with a unit according to the invention intended to regenerate the heat for heating the diathermic oil supplied by diathermic oil pipeline RDOD and supplying the heated diathermic oil back to pipeline RDOD.

The portions of this unit that are identical or similar to the portions of the unit of FIG. 1 are referred to by reference numbers increased by 100.

This unit comprises in combination: a pipe connection consisting of a sleeve 110 fitted in smokestack CM and a side pipe 111 having an on-off valve 112 placed therein; a valve 113 comprising two or more sectors each separately controlled either by an electric motor or by a different means, valve 113 being placed at the mouth or exhaust top of smokestack CM; a heat regenerator 114 of a known type comprising a pipe system for the circulation therein of the diathermic oil to be heated, a pipe 111 being connected to heat regenerator 114; an exhauster 116 operated by a variable speed motor; a first temperature adjuster 123, and, a second temperature adjuster 132 which, as it will be apparent, is intended to adjust the temperature of the diathermic oil which should be supplied to the pipeline intended to supply this diathermic oil to the various users.

The diathermic oil delivery pipeline, referred to be reference RDOD (FIG. 2) comprises a diathermic oil heating boiler CR provided with a burner BCR; an accelerator PC; a pipe CT connecting accelerator PC to boiler CR; a pipe CTA connecting delivery pipeline RDOD to accelerator PC, supplying the cold diathermic oil to be heated within boiler CR to pipeline RDOD; and, a pipe CTP which supplies diathermic oil heated within boiler CR back to delivery pipeline RDOD.

Furthermore, a first inlet pipe 133 connects a first branch 134 of pipe CT to heat regenerator 114, branch 134 being placed close to accelerator PC and a second outlet pipe 135 connects a second branch 136 of pipe CT to heat regenerator 114.

It should be noted that a first valve 130 is placed in the connection of pipe 133 with pipe 134 and a second valve 131 is placed in pipe CT; both vavlves are controlled by control logic 124 so that when valve 130 is closed valve 131 is open and vice-versa.

Furnace FC, diathermic oil delivery pipeline RDOD and the unit of the invention have such a construction as to allow this unit to work as follows: valve 112 of side pipe 111 is opened and exhauster 116 is operated at a minimum constant speed while sector valve 113 closes according to a predetermined program stored in control logic 124.

Control logic 124 also opens valve 130, thus connecting branch 134 to pipe 133, and closes valve 131 placed in pipe TC.

It will be evident that in these conditions, when valve 130 is open and valve 131 is closed, the diathermic oil coming from pipeline RDOD through pipe CTA is circulated by accelerator PC along pipe 136, boiler CR and pipe CTP which will supply it back to pipeline RDOD.

The unit operation is controlled by setting on the second temperature adjuster 132 the temperature of the diathermic oil to be supplied to the users of delivery pipeline RDOD and on the first temperature adjuster 123 the differential between the gas temperature measured by thermocouple TC at the outlet of smoke incinerator IF and the gas temperature measured by thermocouple 122 at the inlet of regenerator 114.

In these conditions, exhauster 116 will work at such a speed as to suck all the hot smoke present in smokestack CM and, possibly, also a minimum portion of "dummy" air.

As mentioned above, this dummy air could pass through sector valve 113 which has such a structure as to never seal mouth BC of smokestack CM.

In these conditions, the diathermic oil will be heated in system 119 of regenerator 114.

When the diathermic oil temperature at the outlet of regenerator 114 exceeds the predetermined temperature set on adjuster 132, control logic 124 will show down the speed of exhauster 116 which will thus suck a lower quantity of gas.

It should be noted that in both embodiments of the invention manometer 25 (FIG. 1) or 125 (FIG. 2) placed within combustion chamber CC of furnace FC for measuring the pressure therein, is connected to control logic 24 or 124 (respectively) which will thus control a decrease in the speed of exhauster 16 or 116 (respectively) to prevent any excessive quantity of smoke from causing the pressure in furnace FC to drop below the normal working pressure.

We claim:

1. A unit for regenerating the heat produced by exhaust gases in a movable hearth furnace used for baking or rebaking carbonaceous materials and for incinerating volatile distillation products contained in said exhaust gases, said movable hearth furnace comprising: a baking chamber having a number of burners and a plurality of combustion air inlets supplied through a single pipe by a first fan placed outside said furnace; a smoke pipe consisting of a first horizontal portion having a gate fitted thereon and a second portion comprising a smoke incinerator comprising means for incinerating of said volatile distillation products provided with a burner; a smokestack placed downstream of said smoke incinerator comprising a thermocouple operatively connected to said burner to control the operation thereof in response to the temperature of smoke passing through said smokestack; and, a dilution air pipe which supplies dilution air supplied by a second fan, also placed outside said furnace, to said smoke incinerator, said unit comprising in combination: a pipe connection consisting of a sleeve fitted in said smokestack and a side pipe having an on-off valve placed therein; a valve comprising two or more sectors placed at the mouth or top of said smokestack, each sector being separately controlled by means of motors; a heat regenerator connected to said side pipe; an exhauster operated by a variable speed motor; a means for controlling the heat to be used for setting a desired differential between the exhaust gas temperature measured by a first thermocouple at an outlet of said smoke incinerator and the exhaust gas temperature measured by a second thermocouple at an inlet of said heat regenerator; a means for using heat regenerated by said heat regenerator to produce a hot fluid; a control means for controlling the condition of said hot fluid; a valve means for controlling the supply of said hot fluid to a pipeline for delivering said hot fluid to various users placed outside said furnace, said pipeline being also provided with an independent means for producing said hot fluid independently of the fluid obtained through said heat regenerator.

2. The unit according to claim 1, wherein said motor means controlling the opening and closing movement of the sectors of said valve comprises an electric motor.

3. The unit according to claim 1, comprising a manometer placed within said baking chamber of said furnace and operatively connected to control logic which controls the motor speed of said exhauster so that said control logic slows down the speed of said motor to decrease the sucking action of said exhauster thus preventing the pressure within said baking chamber of said hearth furnace from dropping below a predetermined minimum working pressure.

4. The unit according to claim 1, wherein said hot fluid produced using the heat regenerated is steam and said means for using regenerated heat to produce a hot fluid is a steam generator.

5. The unit according to claim 1, wherein said hot fluid produced using the heat regenerated is diathermic oil and said means associated to said heat regenerator is a system for heating said diathermic oil.

* * * * *